United States Patent
Tanimoto

(10) Patent No.: US 6,970,315 B2
(45) Date of Patent: Nov. 29, 2005

(54) METHOD AND APPARATUS WRITE CONTROL IN A DISK DRIVE

(75) Inventor: Kazushi Tanimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 10/740,794

(22) Filed: Dec. 22, 2003

(65) Prior Publication Data

US 2004/0136108 A1 Jul. 15, 2004

(30) Foreign Application Priority Data

Dec. 25, 2002 (JP) .............................. 2002-374518

(51) Int. Cl.$^7$ ........................ G11B 21/02; G11B 19/04
(52) U.S. Cl. ........................................ 360/60; 360/75
(58) Field of Search .............................. 360/75, 59–60; 369/53.18

(56) References Cited

U.S. PATENT DOCUMENTS

| | | | |
|---|---|---|---|
| 5,115,225 A | 5/1992 | Dao et al. | |
| 5,461,603 A | 10/1995 | Otsuka | |
| 5,742,566 A | 4/1998 | Imai | |
| 6,069,853 A | 5/2000 | Novotny et al. | |
| 6,405,277 B1 | 6/2002 | Jen et al. | |
| 2001/0038587 A1 * | 11/2001 | Shumura et al. | 369/53.18 |
| 2003/0081337 A1 * | 5/2003 | Tanimoto | 360/60 |

FOREIGN PATENT DOCUMENTS

| | | |
|---|---|---|
| JP | 7-6560 | 0/1995 |
| JP | 2000-236188 | 8/2000 |

* cited by examiner

Primary Examiner—David Hudspeth
Assistant Examiner—Varsha A. Kapadia
(74) Attorney, Agent, or Firm—Pillsbury Winthrop Shaw Pittman, LLP

(57) ABSTRACT

In a disk drive which executes data read operation or data write operation from or into a disk, its CPU determines whether or not the temperature environment of the disk drive is in the high temperature condition exceeding a specified value according to a temperature detection value from a temperature sensor. Under high temperature environment, the CPU aborts re-assignment processing including write operation mode other than ordinary write operation.

15 Claims, 7 Drawing Sheets

METHOD AND APPARATUS WRITE CONTROL IN A DISK DRIVE

CROSS-REFERENCE TO RELATED APPLICATIONS

This application is based upon and claims the benefit of priority from the prior Japanese Patent Application No. 2002-374518, filed Dec. 25, 2002, the entire contents of which are incorporated herein by reference.

BACKGROUND OF THE INVENTION

1. Field of the Invention

The present invention relates generally to a disk drive for magnetically recording data on a disk medium and more particularly to a method and apparatus for write control under a changing-temperature environment.

2. Description of the Related Art

Generally, a disk drive in a magnetic disk apparatus, a magneto-optical disk apparatus or the like is so configured to magnetically record data on a disk medium (hereinafter referred to as disk) and restore magnetic recorded data on the disk to its original form.

The disk drive has been utilized as not only a storage device of a personal computer, as conventionally, but also as a data storage device of a digital TV or various kinds of digital equipment incorporated in a vehicle, its application field being expanded. For this reason, particularly as an operating environment of the disk drive, an appropriate measure for controlling the temperature environment has been demanded.

Usually, to secure a specific reliability, a temperature range which allows the disk drive to operate normally is set up as a product specification preliminarily. For the disk drive, write operation for magnetically recording data on a disk and read operation for reading data from the disk are prominent specifications.

Usually, in the disk drive, the read operation has a wider tolerable range which allows itself to operate against a temperature change than the write operation. Contrary to this, for the write operation, its tolerable range is set relatively smaller under high temperature environment compared to a specified temperature in order to secure reliability of data recorded on a disk.

On this background, there has been proposed a technology which monitors temperatures inside the drive with a temperature sensor and if a change in low temperature exceeding its tolerable range occurs, prohibits the write operation (see Jpn. Pat. Appln. KOKAI Publication No. 7-6560). Further, a technology in which an alarm is dispatched to a system or the operation of a disk drive is stopped, for example, under high temperatures has been proposed (see U.S. Pat. No. 5,115,225).

Generally, the disk drive executes write operation for writing user data into a specified position on a disk according to a write command (data write instruction) from a host system (personal computer or digital machine).

On the other hand, the disk drive has a write operating mode which the host system does not concern (not concerned with issue of the write command) as well as the write operation for recording ordinary user data as described above.

More specifically, a write operating mode called re-assignment processing is available at the time of ordinary read operation or write operation. This processing is an alternative processing for specifying a region on a disk in which data cannot be recorded so as to change the region to another alternative region.

For example, if a read error occurs during read operation, error correction/repair processing is executed by an error detection/correction (ECC) function. In this case, right data after error correction is moved to another position different from the recording position on the disk in the disk drive. The recording position used up to then is prohibited from being used thereafter.

This processing is simply a called re-assignment processing or because it is carried out at the time of read operation, particularly, it is called read reassignment processing. Regardless of the fact that only a read command is issued from the host system at this time, data is automatically written into a certain region on the disk. In the re-assignment processing, write operation for updating address management table information such as a file allocation table recorded in a predetermined position (for example, most outer peripheral track) on the disk is executed.

The write reassignment processing may be executed at the time of write operation also. Generally, in the disk drive, upon read/write operation, a head positioning operation (servo control) of positioning the head at an object track (recording region of access object) on the disk is executed. Upon write operation, the head positioning accuracy is verified to heighten the reliability of data recording and only when a sufficient positioning accuracy is verified, data write is executed.

At the time of this head positioning operation, write retry operation is repeated within predetermined times until a sufficient positioning accuracy is obtained. If the sufficient positioning accuracy is obtained, write operation upon the object track on the disk is executed. On the other hand, when the sufficient positioning accuracy cannot be obtained even if the predetermined retry times are exceeded, a write position on the disk (for example, a sector in the object track) is automatically changed to a certain region (sector) on the disk and the data write is carried out. This processing is an alternative processing called write reassignment processing. In this write reassignment processing also, a write operation mode in which address management table information accompanied by the re-assignment processing is automatically updated, is executed separately from the write operation corresponding to a write command from the host system.

Further, the disk drive has a function of recording disk usage history, for example, history information such as power-on frequency at a specific position on the disk. This function is automatically started when the disk drive is powered on. This function executes updating of the history information at an empty time just after the power is turned ON or during the operation regardless of a command from the host system. In this case, data is automatically written into a certain region on the disk regardless of the fact that no write command is issued from the host system.

As described above, in the disk drive, the write operation mode of recording data other than ordinary user data on the disk is automatically executed regardless of the write command from the host system. When the write operation mode is executed, it can be thought that the temperature environment within the disk drive becomes a high temperature condition exceeding a specified value. The host system cannot control write operation because the host system is not engaged in the write operation even though the reliability of data to be written into the disk is degraded due to a high temperature. In the worst case, address management table information accompanied by the reassignment processing is lost, thereby possibly disabling reading of recorded data from the disk.

BRIEF SUMMARY OF THE INVENTION

In accordance with one embodiment of the present invention, there is provided a disk drive including facilities to prohibit write operation other than ordinary write operation under a high temperature environment exceeding a specified value.

This disk drive comprises a read/write unit for executing data read operation or data write operation from or into a disk medium using a head, a temperature sensor which detects the temperature and a controller for prohibiting the write operation for data other than ordinary user data when the temperature detected by the temperature sensor is higher than the specified value.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described with reference to the accompanying drawings.

(Configuration of Disk Drive)

Figure 1:
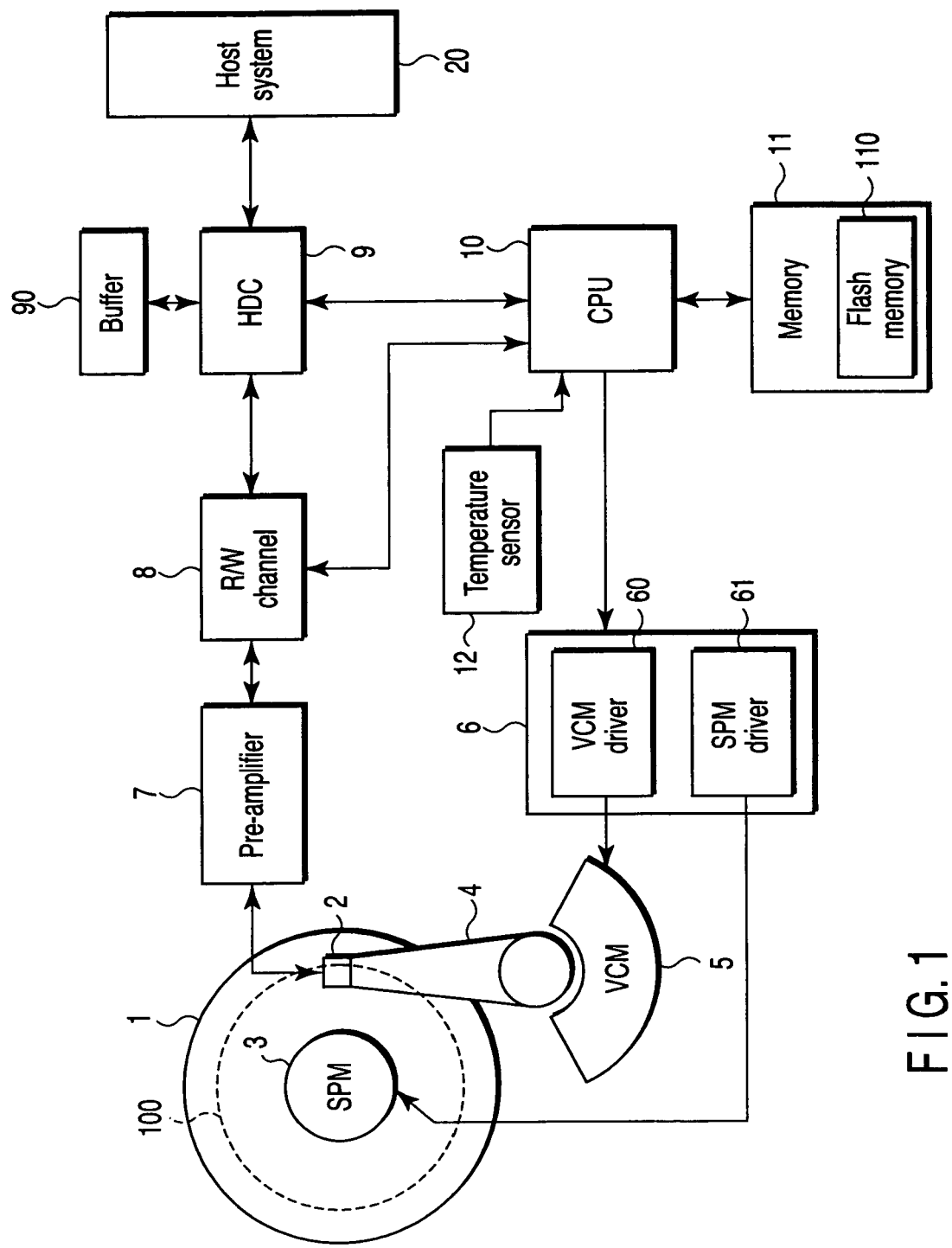
FIG. 1 is a block diagram showing major sections of a disk drive according to each embodiment of the present invention.

FIG. 1 is a block diagram showing major sections of a disk drive according to the embodiments.

As this disk drive, a hard disk drive (HDD) which utilizes a disk 1 as a magnetic recording medium is assumed. The disk drive has a magnetic head 2 which executes data read/write operation upon the disk 1. The disk 1 is fixed on a spindle motor (SPM) 3 and rotated at high velocities. The magnetic head 2 is mounted on an actuator 4 which is driven by a voice coil motor (VCM) 5. The VCM 5 is supplied with a drive current by a VCM driver 60 included in a motor driver IC 6. The motor driver IC 6 includes an SPM driver 61 as well as the VCM driver 60 and is controlled by a CPU 10.

The magnetic head 2 is so configured that a read head for executing read operation and a write head for executing write operation are mounted on a slider. The actuator 4 is controlled by a servo system constituted of mainly the CPU 10 so as to position the magnetic head 2 at a target position on the disk 1.

In addition to this head disk assembly, the disk drive includes a control/circuit system comprising a pre-amplifier circuit 7, a R/W channel 8, a disk controller (HDC) 9, the CPU 10 and a memory 11.

The pre-amplifier circuit 7 has a read amplifier and a write amplifier for amplifying a read signal outputted from the read head. The write amplifier converts a write data signal output from the R/W channel 8 to a write current signal and sends it to the write head. The R/W channel 8 is a signal processing IC for processing a read/write data signal (including a servo data signal).

The HDC 9 has a function of interface between the drive and a host system 20 (for example, a personal computer or digital device). More specifically, the HDC 9 controls a buffer memory 90 and controls transfer of read/write data between the disk 1 and the host system 20. The buffer memory 90 is a DRAM for storing read/write data temporarily. The HDC 9 realizes a write cache function for caching write data and a read cache function for caching read data.

The CPU 10 is a main control unit for the drive, which executes control on operations except ordinary write operation, such as servo system control operation, ordinary read/write operation and re-assignment processing (alternative processing) including ordinary write operation. The memory 11 includes RAM and ROM as well as a flash memory (EEPROM) 110 which is a nonvolatile memory and stores various kinds of data and programs necessary for control on the CPU 10.

Further, this drive has a temperature sensor 12 for detecting a temperature inside the drive. The temperature sensor 12 detects temperatures at a specified sampling interval and outputs a corresponding temperature to the CPU 10. The CPU 10 monitors changes of temperature in accordance with detection of temperature from the temperature sensor 12. A temperature detection value by the temperature sensor 12 is regarded as "D" here. As temperature environment for the disk drive, a standard temperature value which allows ordinary read/write operation to be executed normally is noted as a specified value T. According to this embodiment, the specified value T means a high temperature limit value in a temperature range from a low temperature limit to a high temperature limit set up as the specification of the disk drive.

If the surrounding temperature (D) of the drive is the specified value T or more, the CPU 10 determines that it is located under a temperature environment which disables write operation mode except ordinary write operation, such as re-assignment processing from being executed although the ordinary read/write operation can be executed. Usually, the temperature sensor 12 is mounted on a circuit board provided in the disk drive.

Meanwhile, the host system 20 may be so configured to have an independent temperature sensor for monitoring changes in the surrounding temperature of itself and the drive and notify the CPU 10 of a temperature detection value D through the HDC 9. Further, the host system 20 can acquire the temperature value D detected by the temperature sensor 12 from the disk drive by issuing a predetermined command.

(Relation between Write Operation and Temperature Environment)

Figure 4:
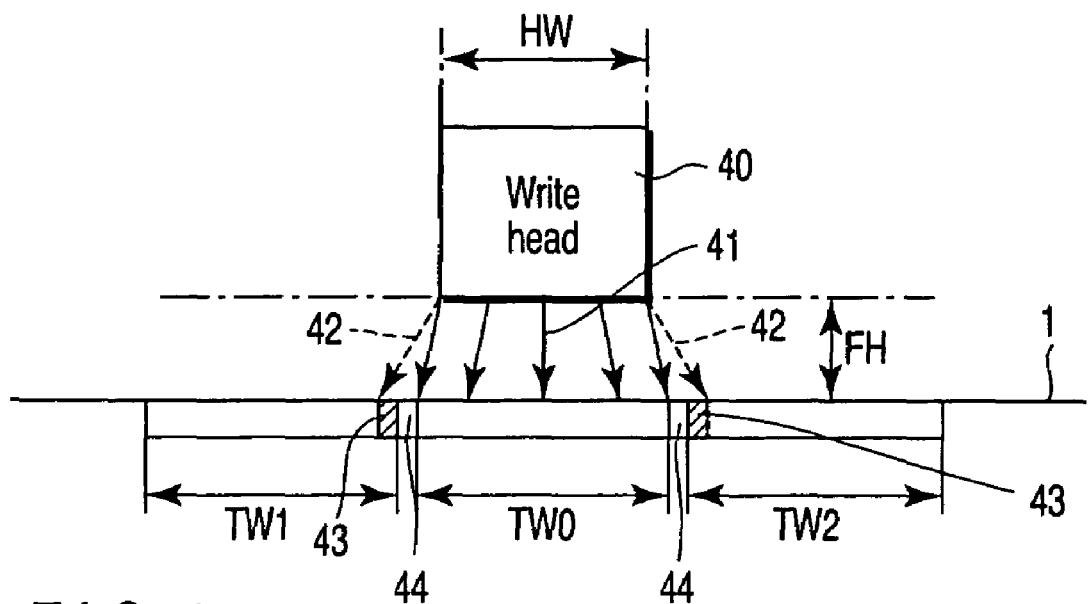
FIG. 4 is a diagram for explaining the relation between write operation and temperature environment according to each embodiment.

In the disk drive, the magnetic head 2 is flying over the disk 1 at the time of read/write operation. FIG. 4 shows a state in which the write head 40 included in the magnetic head 2 writes data into a target track (TW0) on the disk 1. On the disk 1, a gap 44 with a predetermined width is provided between the target track (TW0) and adjacent tracks (TW1, TW2).

Generally, magnetic flux 41 generated from the write head 40 accompanied by write operation has a feature of expanding in space so that it is expanded more than the width (HW) of the write head on the disk 1. For the reason, the width of the track (TW0) to be recorded on the disk 1 becomes larger than the width (HW) of the write head.

Thus, as described above, the track pitch is set slightly wider, for example, wider by about 20% than the width (HW) of the write head by the gap 44 to adjacent track. It is so designed that adjacent tracks do not interfere with each other through recording magnetic fields. Actually, as shown in FIG. 4, leaking magnetic flux 42 is expanded outside the track width. However, because the leaking magnetic flux 42 has a lower magnetic flux density than the proper magnetic flux 41, it does not affect adjacent tracks if the temperature is within an ordinary temperature range.

However, if the surrounding temperature of the disk 1 reaches an extremely high temperature, the coercivity of the magnetic layer on the disk surface drops, so that the magnetic layer is more likely to be affected by a weak leaking magnetic flux 42. An interference on the adjacent tracks (TW1, TW2) by this leaking magnetic flux 42 is called fringe magnetic field. This fringe magnetic field can reduce the reliability of data recorded in the adjacent tracks. In the disk drive, a high temperature side of a temperature range at which the fringe magnetic field does not affect the adjacent tracks, is specified as a high temperature limit.

(First Embodiment)

Figure 2:
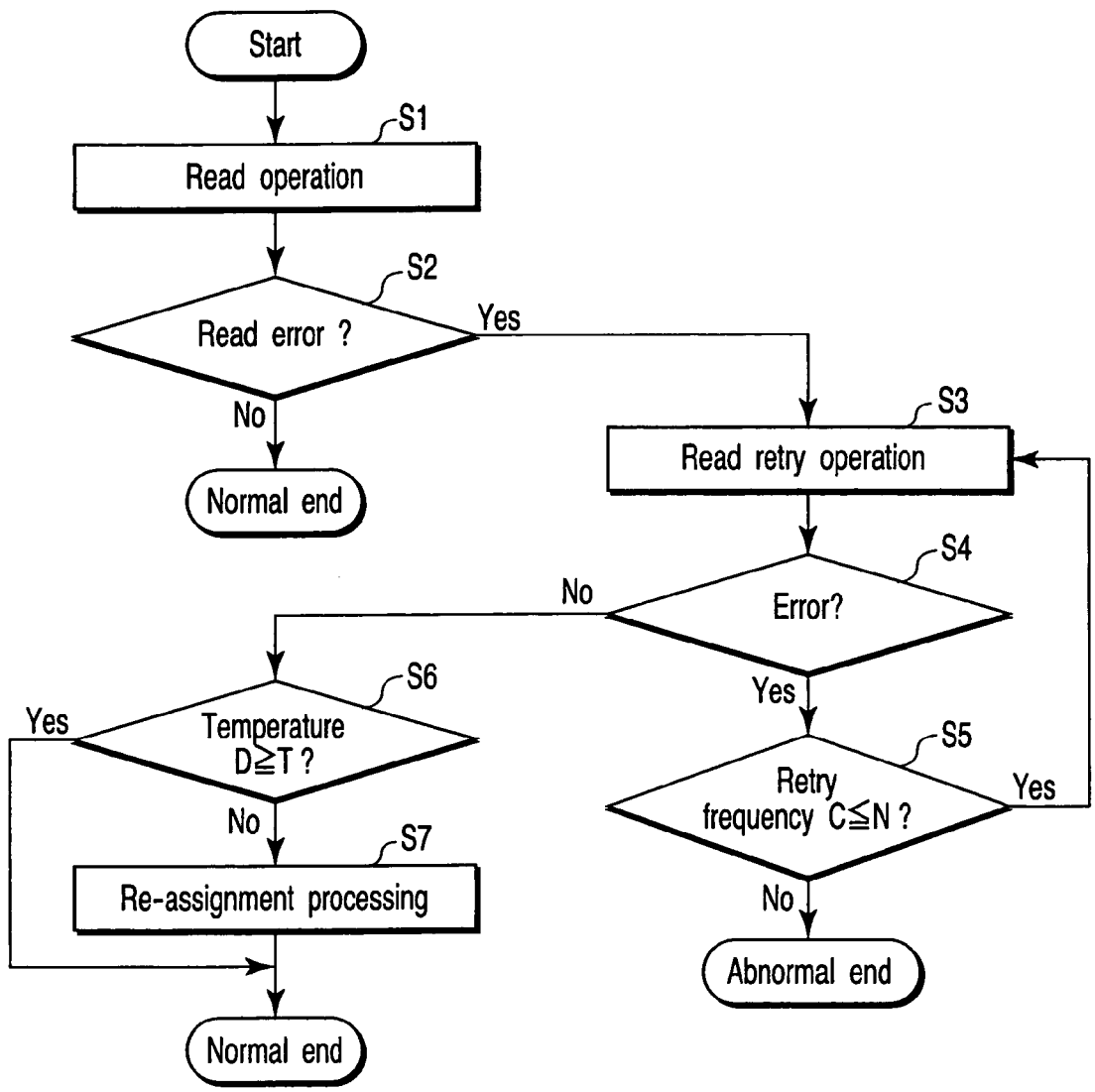
FIG. 2 is a flow chart for explaining the procedure of a write control method according to a first embodiment of the invention.

Hereinafter, a first embodiment of the present invention will be described with reference to the flow chart of FIG. 2 as well as FIG. 1.

It is assumed that the disk drive receives a read command from the host system 20. After receiving the read command, the CPU 10 positions the head 2 in a specified recording region (target track) on the disk 1 and executes read operation for reading data from the recording region (step S1). When normal data is reproduced by this read operation, normal end occurs (NO in step S2).

On the other hand, when a read error occurs, the CPU 10 executes read retry operation using the error detection/correction function (ECC function) (YES in step S2, S3). If the error portion is corrected and repaired by this read retry operation and normal data is reproduced, the CPU 10 inputs the temperature detection value D from the temperature sensor 12 and determines the temperature environment of the disk drive (step S6).

That is, the CPU 10 determines whether or not the temperature environment at this point of time is under a high temperature condition not less than the specified value T. If the surrounding temperature (D) of the disk drive is less than the specified value T, the CPU 10 executes re-assignment processing and then normal end occurs (NO in step S6, S7). On the other hand, if the surrounding temperature (D) is the specified value T or more, the CPU 10 refrains from executing the re-assignment processing and normal end occurs (YES in step S6).

The CPU 10 repeats the read retry operation up to a predetermined upper limit time (N) until the error is repaired (steps S3 to S5). When the error is not repaired though the retry frequency (C) exceeds the upper limit time (N), the CPU 10 determines that the read is disabled (ECC error) and then abnormal end occurs (NO in step S5).

If normal data reproduction succeeds as a result of the read retry operations within the upper limit time (N), the CPU 10 proceeds to a processing of determining whether or not the temperature environment at this point of time is in the high temperature condition not lower than the specified value T (NO in step S4, S6). If the surrounding temperature (D) of the disk drive is less than the specified value T like the above-described processing, the CPU 10 executes the re-assignment processing and then normal end occurs (NO in step S6, S7). On the other hand, if the surrounding temperature (D) is a high temperature of the specified value T or more, the CPU 10 refrains from executing the re-assignment processing and normal end occurs (YES in step S6).

In short, if normal data reproduction succeeds as a result of the read retry operation, when the temperature environment of the disk drive is in a high temperature-condition exceeding the specified value, the re-assignment processing is not executed and normal end occurs. In other words, the write operation contained in the re-assignment processing is prohibited. Thus, because the write operation mode accompanied by the re-assignment processing is prohibited regardless of a command from the host system, data such as address management table information can be avoided from being recorded on the disk. Consequently, it is possible to protect data whose reliability drops under high temperature environment from being recorded on the disk.

(Second Embodiment)

Figure 3:
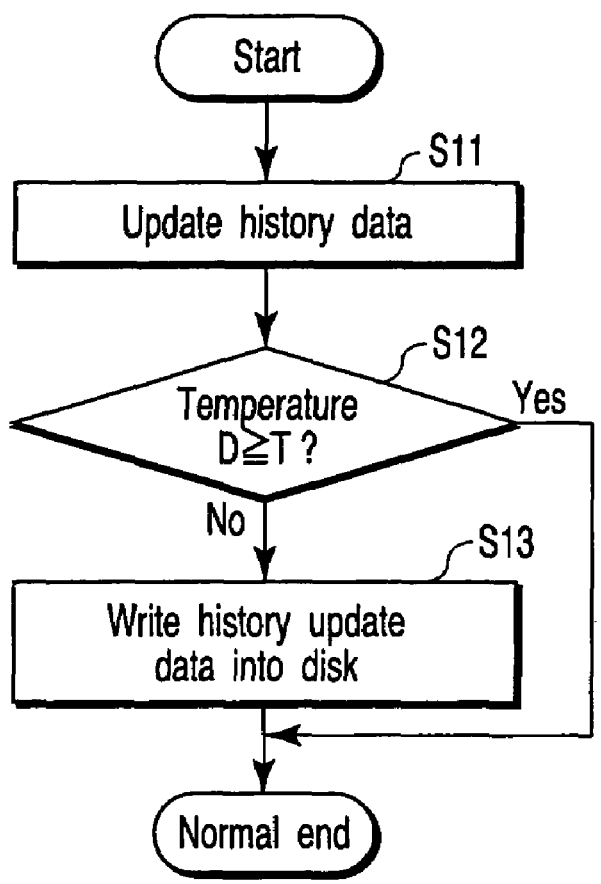
FIG. 3 is a flow chart for explaining the procedure of a write control method according to a second embodiment of the invention.

FIG. 3 is a flow chart of a second embodiment of the invention.

The disk drive is provided with a function of automatically recording operation history information of the drive in a specified region on the disk. The write operation for this history information is executed regardless of a command from the host system. More specifically, just after the power is turned on, the CPU 10 updates history information about power-on count, re-assignment count, abnormal stop count and the like in an empty time other than the read/write operation (step S11).

Upon this updating, the CPU 10 inputs the temperature detection value D from the temperature sensor 12 so as to determine whether or not the temperature environment of the disk drive is in the high temperature condition not lower than the specified value T (step S12).

If the surrounding temperature (D) of the disk drive is less than the specified value T, the CPU 10 updates the history information (that is, write operation) and then, normal end occurs (NO in step S12, S13). On the other hand, if the surrounding temperature (D) is higher than the specified value T, the CPU 10 refrains from executing the update of the history information and normal end occurs (YES in step S12).

If the temperature environment of the disk drive exceeds the specified value, the write operation for updating the drive history information is aborted. Therefore, it is possible to protect the history information whose reliability drops under such high temperature environment from being recorded on the disk.

(Third Embodiment)

Figure 5:
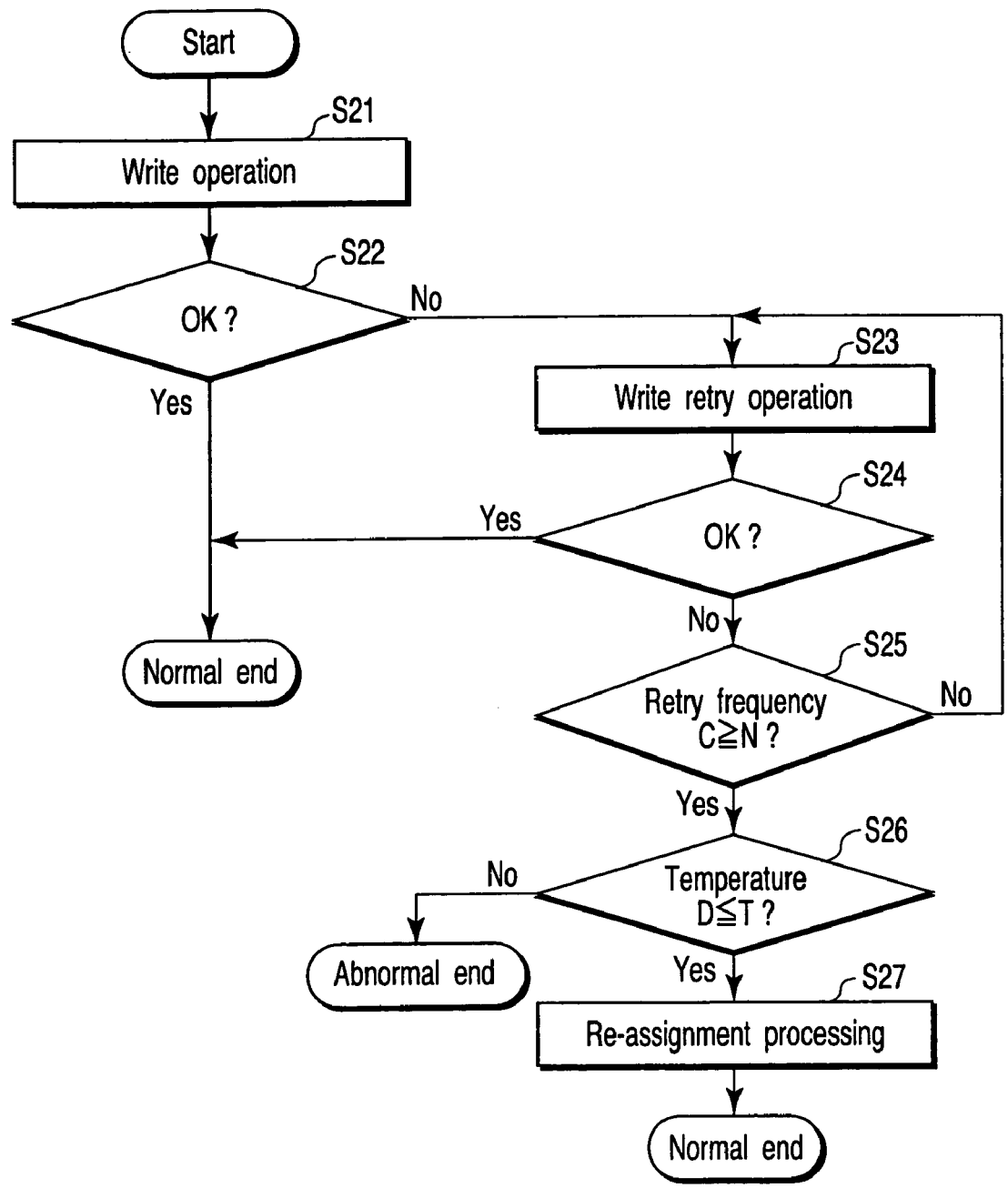
FIG. 5 is a flow chart for explaining the procedure of a write control method according to a third embodiment of the invention.

FIG. 5 is a flow chart of a third embodiment of the invention.

The disk drive executes write operation for writing data on the disk 1 according to a write command from the host system 20. The CPU 10 positions the head 2 in a specified region on the disk 1 following the write command and executes write operation for writing data that is transmitted from the host system 20 (step S21).

At the time of this write operation, the CPU 10 verifies the positioning accuracy of the head 2 to the specified region on the disk 1. The CPU 10 determines that execution of normal write operation is enabled if the positioning accuracy is sufficient, and executes data write (YES in step S22). The positioning accuracy of the head 2 changes depending on a state of servo information recorded on the disk preliminarily, disturbance to be applied to the drive (acceleration) and other influences. When the CPU 10 verifies that normal write operation on the disk 1 is enabled, it notifies the host system 20 that normal end occurs as a result of executing the write operation.

On the other hand, when it cannot verify a sufficient positioning accuracy, the write operation is interrupted and the write retry operation (that is, head positioning operation) is repeated within the predetermined number of times (N) (NO in step S22, S23 to S25). When it verifies a sufficient head positioning accuracy as a result of this write retry operation, the CPU 10 executes the write operation and notifies the host system 20 that normal end occurs (YES in step S24).

On the other hand, if the above-mentioned condition cannot be secured so that no sufficient head positioning accuracy can be verified though the write retry frequency (C) exceeds the predetermined number of times (N), the CPU 10 stops the write operation in the specified region on the disk 1 at this time (YES in step S25).

The CPU 10 inputs the temperature detection value D from the temperature sensor 12 so as to determine a temperature environment of the disk drive at this time (step S26). If the temperature detection value D is not higher than the specified value T, the CPU 10 proceeds to write re-assignment processing (YES in step S26, S27). In the write re-assignment processing, the CPU 10 automatically changes data write position to an alternative region on the disk. At this time, the CPU 10 automatically changes the address management table information with a change in the write position. If the CPU 10 succeeds in executing normal write operation after the write re-assignment processing ends, it notifies the host system 20 of this normal end.

On the other hand, if the CPU 10 verifies that the temperature detection value D exceeds the specified value T, it interrupts the write re-assignment processing and proceeds to a predetermined abnormality processing (NO in step S26). The predetermined abnormality processing includes notifying the host system 20 that the CPU 10 cannot execute the write operation normally.

In conclusion, if the temperature environment of the disk drive is in the high temperature condition exceeding the specified value when write re-assignment processing which the host system 20 does not concern is executed, the write re-assignment processing is aborted. Therefore, due to the high temperature condition, the data write operation accompanied by re-assignment processing whose reliability can have dropped is stopped. The CPU 10 executes the write operation for writing ordinary user data into a specified region according to a write command form the host system even at high temperatures.

(Fourth Embodiment)

Figure 6:
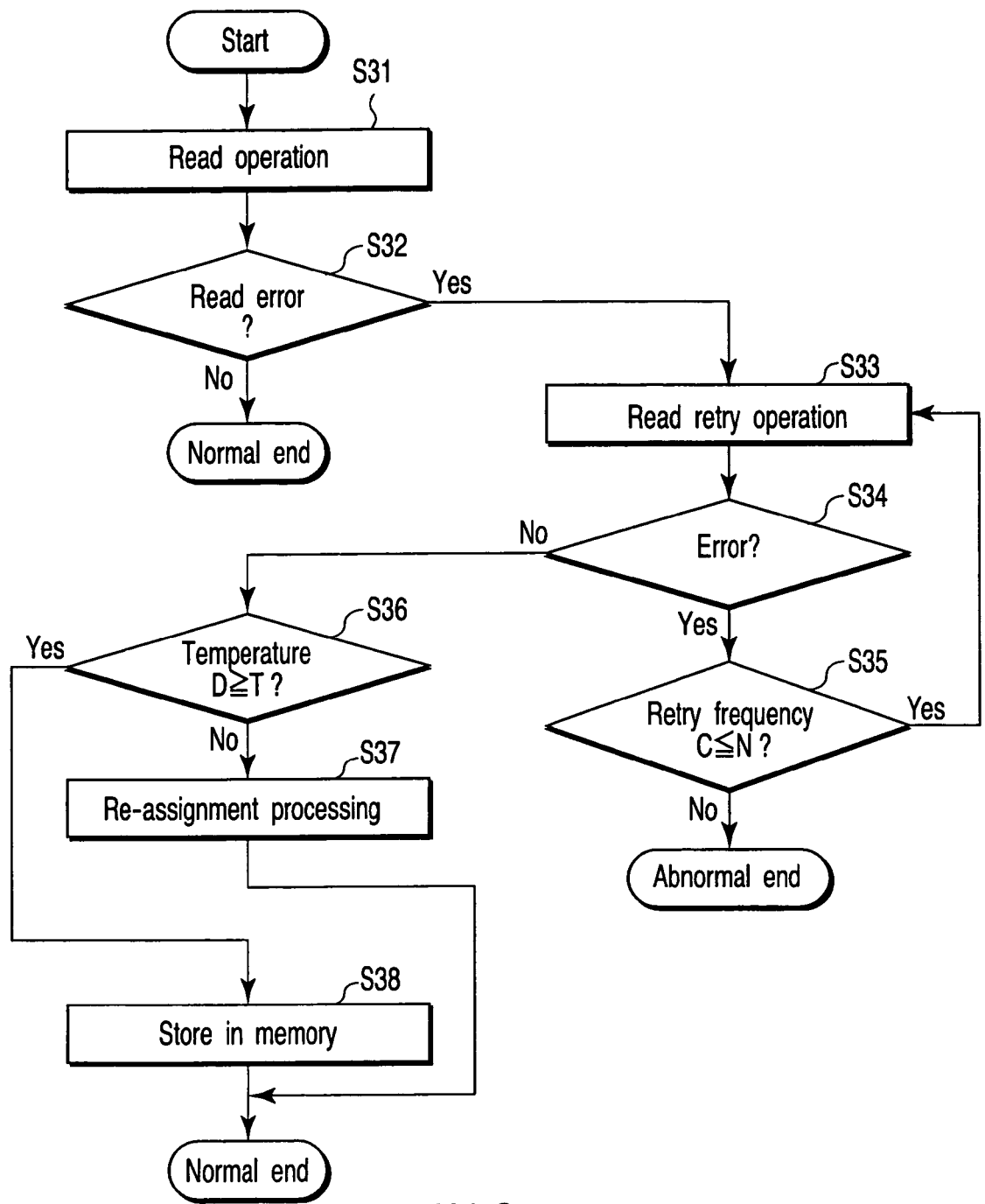
FIG. 6 is a flow chart for explaining the procedure of a write control method according to a fourth embodiment of the invention.

FIG. 6 is a flow chart of a fourth embodiment of the invention.

If the temperature environment of the drive is in the high temperature condition when the read re-assignment processing is executed, the disk drive aborts the re-assignment processing (YES in step S36). According to this embodiment, data accompanied by the re-assignment processing (address management table information and the like) is stored in the flash memory 110 (step S38).

In this case, when the temperature environment returns from the high temperature condition to a steady condition, the CPU 10 writes data stored in the flash memory 110 into a predetermined region on the disk. That is, the CPU 10 restarts the interrupted read re-assignment processing.

This embodiment concerns handling of the read re-assignment processing at the time of read operation in the same manner as in the first embodiment. Thus, respective processings from step S31 to step S37 in FIG. 6 correspond to respective processings from step S1 to step S7 in FIG. 2.

(Fifth Embodiment)

Figure 7:
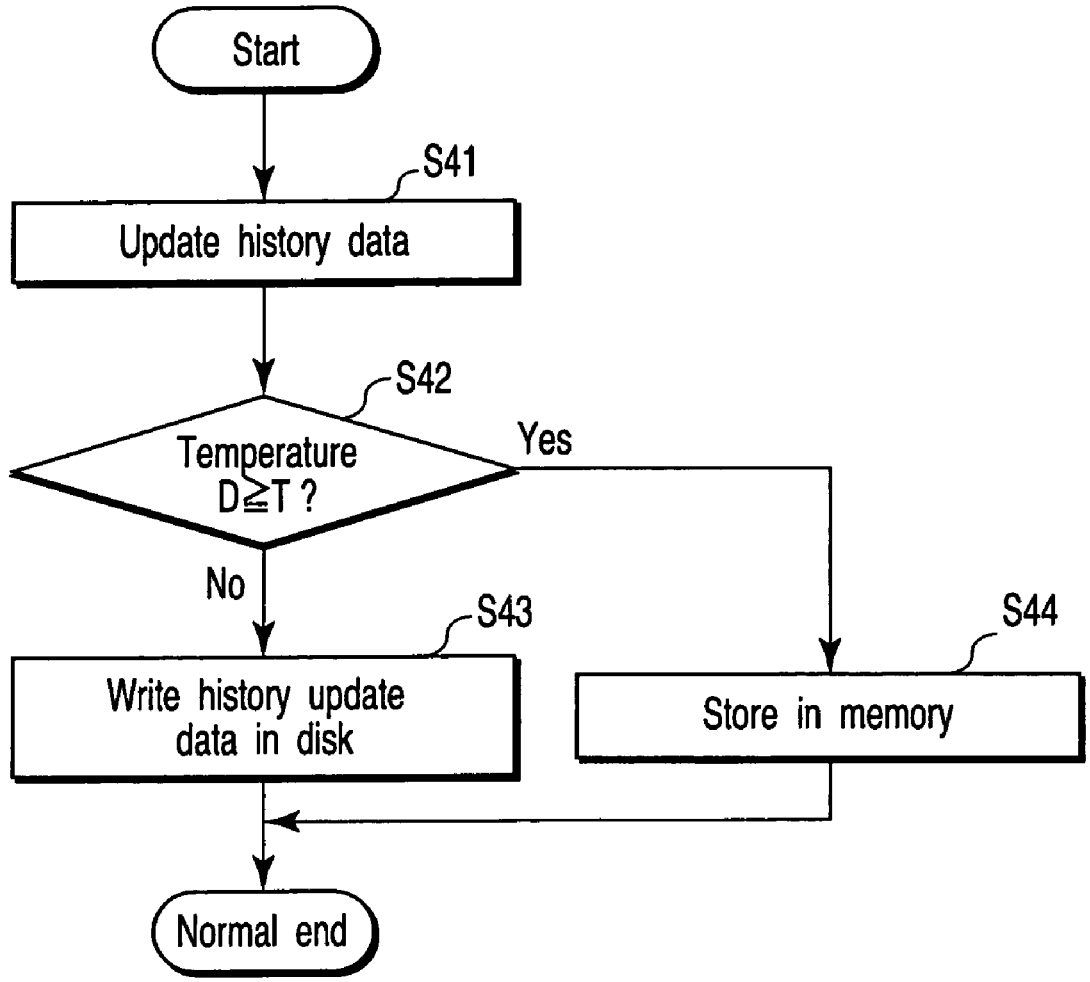
FIG. 7 is a flow chart for explaining the procedure of a write control method according to a fifth embodiment of the invention.

FIG. 7 is a flow chart of a fifth embodiment of the invention.

The disk drive has a function of automatically recording operation history information of the drive into a specific region on the disk, for example, just after the power is turned ON (steps S41, S43). According to this embodiment, if the temperature environment of the drive is in the high temperature condition, the history information is not recorded on the disk but stored in the flash memory 110 (YES in step S42, S44).

In this case, when the temperature environment returns to the high temperature condition to its steady condition, the CPU 10 writes history information stored in the flash memory 110 into a specified region on the disk.

In the meantime, this embodiment concerns handling of the history information at the time of updating in the same manner as in the second embodiment. Thus, respective processings from step S41 to step S43 in FIG. 7 correspond to respective processings from step S11 to step S13 in FIG. 3.

(Sixth Embodiment)

Figure 8:
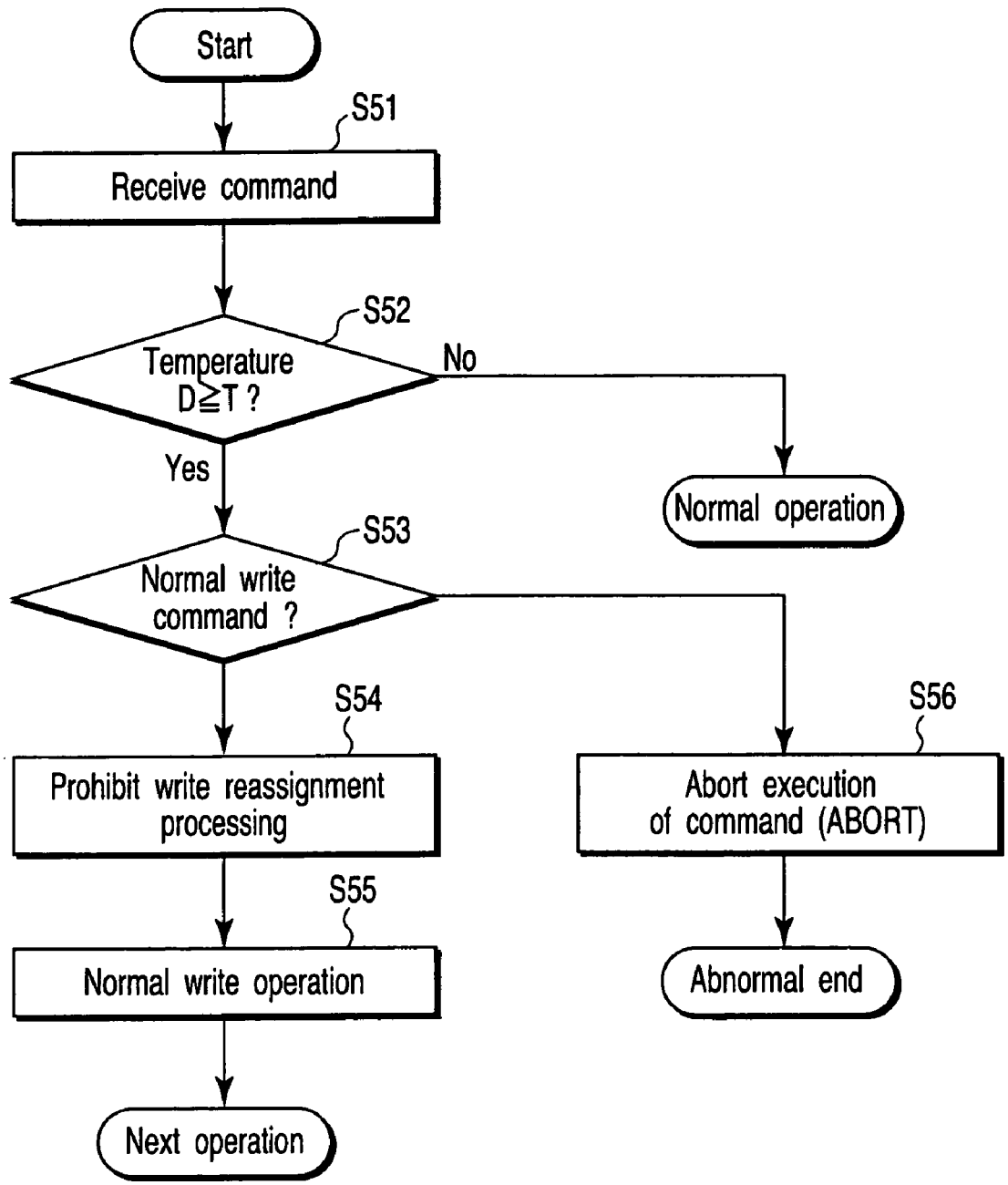
FIG. 8 is a flow chart for explaining the procedure of a write control method according to a sixth embodiment of the invention.

FIG. 8 is a flow chart of a sixth embodiment of the invention.

This embodiment concerns a write control method in which, of write related commands to be received from the host system 20, an ordinary write command (first write command) relating to recording of ordinary user data and an extraordinary write command (second write command) relating to recording of data other than ordinary user data are handled distinguishably. Hereinafter, this embodiment will be described specifically with reference to the flow chart of FIG. 8.

If a write related command is received from the host system 20, the CPU 10 proceeds to executing the write operation mode indicated by the command (step S51). At this time, the CPU 10 inputs the temperature detection value D from the temperature sensor 12 and determines a temperature environment of the disk drive at that time (step S52). If the temperature detection value D is the specified value T or less, the CPU 10 executes ordinary operation following an instruction of the write related command (NO in step S52).

On the other hand, if the CPU 10 verifies that the temperature detection value D is in the high temperature condition exceeding the specified value T, it determines whether or not the received command is an ordinary write command (first write command) (step S53). If the command from the host system 20 is an ordinary write command, the CPU 10 prohibits write re-assignment processing in the same manner as in the third embodiment (YES in step S53, S54). If write OK is established, the CPU 10 executes the write operation for writing ordinary user data into the disk (step S55).

Next, if the temperature environment of the disk drive is in the high temperature condition and the received command is an extraordinary write command (second write command), the CPU 10 prohibits execution of the command (NO in step S53, S56).

The extraordinary write command (second write command) mentioned here refers to a command group which instructs to record data different from ordinary user data into a specified region on the disk 1. More specifically, the extraordinary write command group includes, for example, write error log related to SMART (self-monitoring, analysis and reporting technology), save attribute values and the like.

If the CPU 10 aborts execution of the extraordinary write command, it notifies the host system 20 of the fact without executing normal command processing and then, abnormal end occurs.

In conclusion, if the temperature environment of the disk drive is in the high temperature condition when an extraordinary write command is executed of write related commands issued from the host system 20, execution of the command is aborted. The extraordinary write command is a command which is related to the performance of the disk drive and for recording information demanded for a high reliability. Therefore, by executing the extraordinary write command at high temperatures, information whose reliability has dropped is prevented from being recorded in the disk 1.

As described above, according to this embodiments, under the high temperature environment exceeding the specified value, write operation other than ordinary write operation, for example, write operation accompanied by for example, re-assignment processing can be prohibited. Thus, of states which for example, the host system does not concern, a state in which data of a low reliability is recorded on the disk and left as it is can be avoided. Consequently, the reliability of data to be recorded on the disk can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a read/write unit which executes data read operation or data write operation on a disk medium using a head;
a temperature sensor which detects a temperature; and
a controller which, when the temperature detected by the temperature sensor is higher than a specified value, prohibits the write operation for data other than ordinary user data; and
means for, at the time of execution of the read operation, executing re-assignment processing for changing a read object region on the disk medium to an alternative region, wherein, when the temperature detected by the temperature sensor is higher than the specified value, the controller aborts the re-assignment processing.

2. A disk drive comprising:
a read/write unit which executes data read operation or data write operation on a disk medium using a head;
a temperature sensor which detects a temperature; and
a controller which, when the temperature detected by the temperature sensor is higher than a specified value, prohibits the write operation for data other than ordinary user data; and
means for recording history data indicating operation history of the disk drive on the disk medium and updating the history data at a predetermined timing, wherein, when the temperature detected by the temperature sensor is higher than the specified value, the controller aborts processing of updating the history data.

3. A disk drive comprising:
a read/write unit which executes data read operation or data write operation on a disk medium using a head;
a temperature sensor which detects a temperature; and
a controller which, when the temperature detected by the temperature sensor is higher than a specified value, prohibits the write operation for data other than ordinary user data; and
means for, at the time of execution of the write operation, executing the re-assignment processing for changing a write object region on the disk medium to an alternative region,
wherein, when the temperature detected by the temperature sensor is higher than the specified value, the controller aborts the re-assignment processing.

4. A disk drive comprising:
a read/write unit which executes data read operation or data write operation on a disk medium using a head;
a temperature sensor which detects a temperature; and
a controller which, when the temperature detected by the temperature sensor is higher than a specified value, prohibits the write operation for data other than ordinary user data; and
a memory which stores data in addition to the disk medium, wherein, when the temperature detected by the temperature sensor is higher than the specified value, the controller prohibits the write operation for data other than ordinary user data and stores the data in the memory.

5. A disk drive comprising:
a read/write unit which executes data read operation or data write operation on a disk medium using a head;
a temperature sensor which detects a temperature; and
a controller which, when the temperature detected by the temperature sensor is higher than a specified value, prohibits the write operation for data other than ordinary user data;
a memory which stores data in addition to the disk medium; and
means for, at the time of execution of the read operation, executing the re-assignment processing for changing a read object region on the disk medium to an alternative region,
wherein, when the temperature detected by the temperature sensor is higher than the specified value, the controller aborts the re-assignment processing and stores data necessary for the re-assignment processing in the memory.

6. A disk drive comprising:
a read/write unit which executes data read operation or data write operation on a disk medium using a head;
a temperature sensor which detects a temperature; and
a controller which, when the temperature detected by the temperature sensor is higher than a specified value, prohibits the write operation for data other than ordinary user data; and
a memory which stores data in addition to the disk medium; and
means for recording history data indicating the operation history of the disk drive on the disk medium and updating the history data at a predetermined timing,
wherein, when the temperature detected by the temperature sensor is higher than the specified value, the controller aborts processing of updating the history data and storing the history data in the memory.

7. A disk drive comprising:
a read/write unit which executes data read operation or data write operation on a disk medium using a head;
a unit which receives a command group containing a second write command for instructing the write operation for data other than ordinary user data as well as a first write command for instructing the write operation for the ordinary user data;
a temperature sensor which detects a temperature; and
a controller which, when the temperature detected by the temperature sensor is higher than a specified value, aborts the second write command and executes the write operation following the first write command.

8. The disk drive according to claim 7, wherein, when the temperature detected by the temperature sensor is higher than the specified value, the controller prohibits the write operation for recorded data other than the user data on the disk medium accompanied by execution of the first write command.

9. A method of controlling write operation in a disk drive which executes data read operation or data write operation to a disk medium using a head, the method comprising:
detecting a temperature;
prohibiting the write operation of data other than ordinary user data when the detected temperature is higher than a specified value;
executing re-assignment processing for changing a read object region on the disk medium to an alternative region at the time of execution of the read operation; and
aborting the re-assignment processing when the detected temperature is higher than the specified value, upon prohibiting the write operation.

10. A method of controlling write operation in a disk drive which executes data read operation or data write operation to a disk medium using a head, the method comprising:
detecting a temperature;
prohibiting the write operation of data other than ordinary user data when the detected temperature is higher than a specified value;
recording history data indicating operation history of the disk drive on the disk medium and updating the history data at a predetermined timing; and
aborting processing of updating the history data when the detected temperature is higher than the specified value, upon prohibiting the write operation.

11. A method of controlling write operation in a disk drive which executes data read operation or data write operation to a disk medium using a head, the method comprising:
detecting a temperature;
prohibiting the write operation of data other than ordinary user data when the detected temperature is higher than a specified value;
executing re-assignment processing for changing a write object region on the disk medium to an alternative region at the time of execution of the write operation; and
aborting the re-assignment processing when the detected temperature is higher than the specified value, upon prohibiting the write operation.

12. A method of controlling write operation in a disk drive which executes data read operation or data write operation to a disk medium using a head, the method comprising:
detecting a temperature;
prohibiting the write operation of data other than ordinary user data when the detected temperature is higher than a specified value;
being applied to the disk drive having a memory which stores data separately from the disk medium;
executing re-assignment processing for changing a read object region on the disk medium to an alternative region at the time of execution of the read operation; and
aborting the re-assignment processing when the detected temperature is higher than the specified value and storing data necessary for the re-assignment processing in the memory, upon prohibiting the write operation.

13. A method of controlling write operation in a disk drive which executes data read operation or data write operation to a disk medium using a head, the method comprising:
detecting a temperature;
prohibiting the write operation of data other than ordinary user data when the detected temperature is higher than a specified value;
being applied to the disk drive having a memory which stores data separately from the disk medium;
recording history data indicating operation history of the disk drive on the disk medium and updating the history data at a predetermined timing: and
aborting processing of updating the history data when the detected temperature is higher than the specified value and storing the history data in the memory, upon prohibiting the write operation.

14. A method of controlling write operation in a disk drive which executes data read operation or data write operation to a disk medium using a head, the method comprising:
receiving a command group containing a second write command for instructing the write operation for data other than ordinary user data as well as a first write command for instructing the write operation for the ordinary user data;
detecting a temperature; and
when the detected temperature is higher than a specified value, prohibiting the write operation following the second write command.

15. The method according to claim 14, further comprising:
upon prohibiting the write operation, prohibiting the write operation of recorded data other than the user data on the disk medium accompanied by execution of the first write command when the detected temperature is higher than the specified value.

* * * * *